Feb. 4, 1947.   G. D. ARNOLD   2,415,076
INDIVIDUAL ROOM AIR CONDITIONER
Filed April 11, 1945   2 Sheets-Sheet 1

Inventor
George D. Arnold,

By Clarence A. O'Brien
and Harvey B. Jacobson
Attorneys

Feb. 4, 1947.  G. D. ARNOLD  2,415,076
INDIVIDUAL ROOM AIR CONDITIONER
Filed April 11, 1945  2 Sheets-Sheet 2

Inventor
George D. Arnold,

By Clarence A. O'Brien
and Harvey B. Jacobson
Attorneys

UNITED STATES PATENT OFFICE 2,415,076

INDIVIDUAL ROOM AIR CONDITIONER

George D. Arnold, Peru, Ind.

Application April 11, 1945, Serial No. 587,711

2 Claims. (Cl. 219—39)

This invention relates to air conditioners and has for its object to provide a combined heater and cooler for individual rooms.

Another object of the invention is to provide a portable hot water heater.

A further object of the invention is to provide a portable circulating hot water heater.

Another object of the invention is to provide a portable electrically actuated unit for heating a single room in cold weather and for cooling the room in hot weather.

Other features and advantages will become more readily apparent from the following description and the accompanying illustrative drawings in which.

Figure 1:
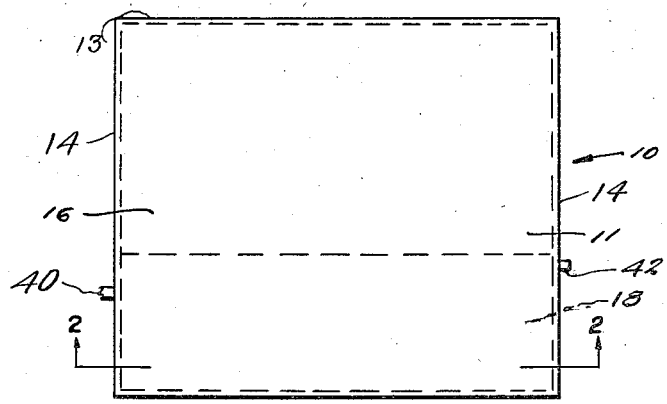
Figure 1 is a top plan view of my invention.
Figure 2:
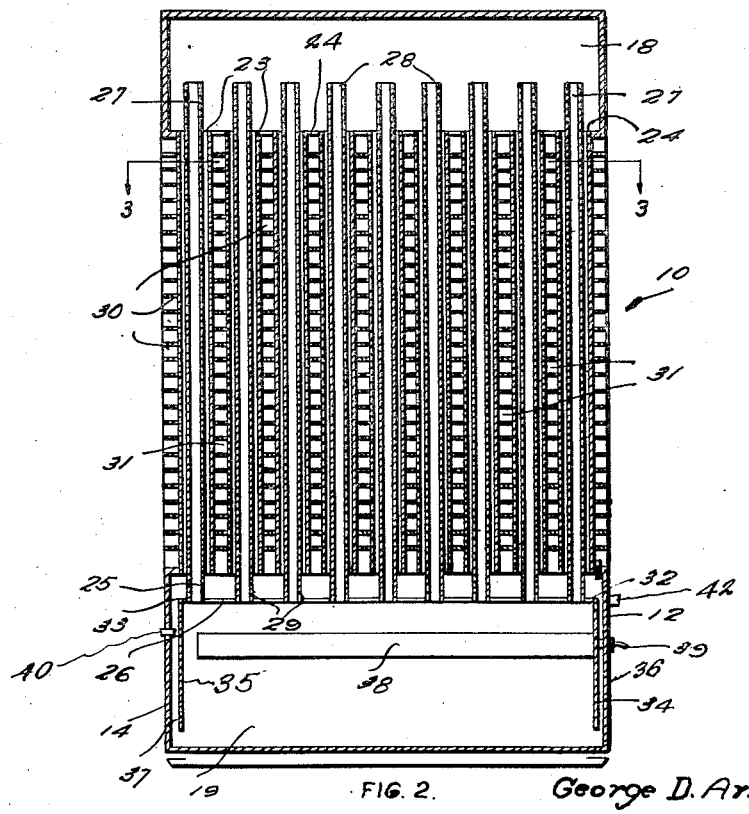
Figure 2 is a sectional view taken on line 2—2 of Figure 1.
Figure 3:
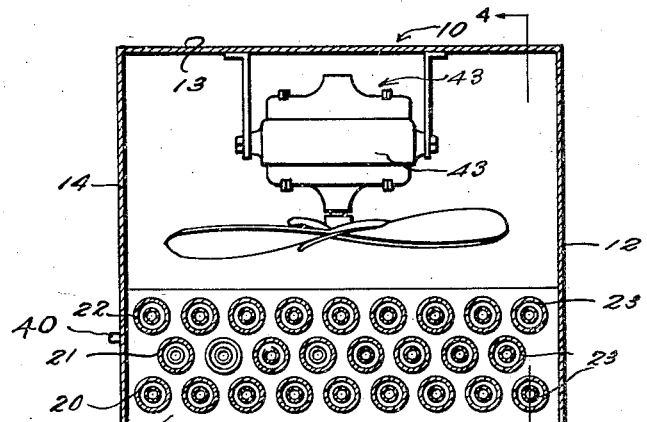
Figure 3 is a similar view taken on line 3—3 of Figure 2.
Figure 4:
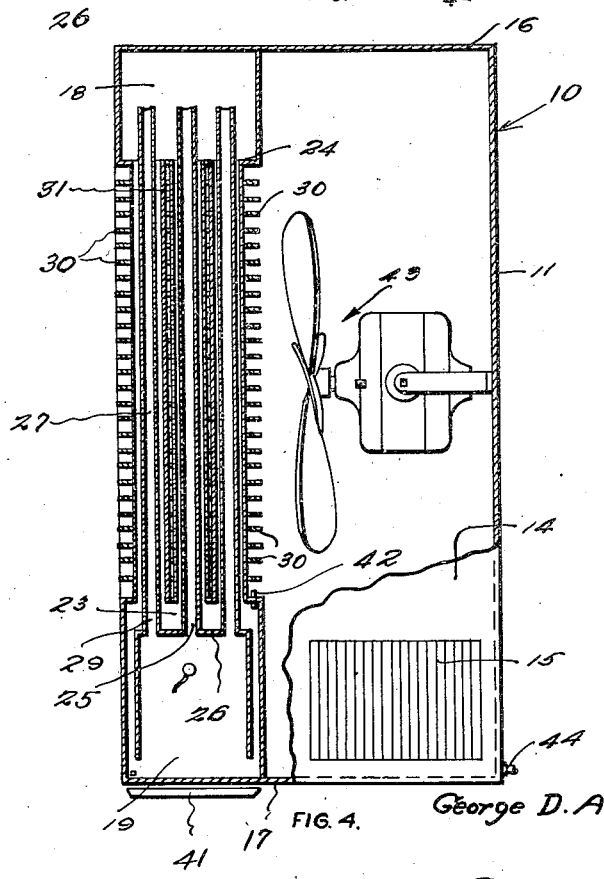
Figure 4 is a section on line 4—4 of Figure 3.

In the drawings presented herewith and in the specification which follows the same reference characters refer to the same elements throughout. The character 10 indicates my portable air conditioner which consists of a cabinet 11, closed on three sides 12, 13 and 14, except for an air inlet grill and filter 15, at the bottom of wall 14. The top wall 16, and the bottom wall 17, are also imperforate.

In the forward upper end of the cabinet is a longitudinal tank 18, and directly thereunder in the bottom of the cabinet is another tank 19. Connecting these two tanks is a series of several longitudinally arranged rows 20, 21 and 22, of tubes 23, the upper ends of which terminate in the bottom wall 24 of tank 18, and their lower ends 25 terminate at and open upon the top wall 26 of tank 19. Mounted within each of these pipes 23 are longer pipes 27 which are of a smaller diameter than the said pipes 23. The upper ends 28 of the pipes 27 project above the said wall 24, and the lower ends 29 project below the tubes 23 and penetrate the wall 26. All of the larger tubes 23 are provided with slightly spaced apart heat conducting fins 30 of a size to substantially extend from one tube 23 to another thereof, thus forming the honeycomb passages 31 therebetween. The wall 26 terminates at both ends 32 and 33 short of the walls 12 and 14, and is provided with downwardly extending flanges 34 and 35 between which flanges and the said walls 13 and 14 are formed passageways 36 and 37 leading into tank 19.

Provided in tank 19 is an electric heating element 38 having a cut in plug 39 extending through the wall 12. A self feeding water and relief valve 40 is connected through the wall 14 into tank 19. A drip pan 41 is provided under the cabinet and is used as a cooling device. An immersion control 42 is provided for the control of water temperature. Mounted on the inside of the rear wall 13 is an electric fan 43.

The action of the above described portable hot water and air conditioner is very simple and practically self apparent. As a heater the heating unit 38 is switched on and as the tank 19 is sealed and contains only a comparatively small quantity of water, the same very quickly heats and is forced up the pipes 29 and overflows into tank 18, from which it flows through tubes 23 onto wall 26 and thence through passages 36 and 37 back into tank 19, which action is continuous as long as current is supplied to 38. As soon as the pipes become hot the switch 44 to electric fan is turned on and air is drawn in through grid 15 and forced out into the room through the honeycomb passages 31, thus heating the air on its way through.

As a cooling device the tank 18 may be supplied with ice, the drippings of which will cool the tubes 23, and the blast from the fan 43 passing between the pipes will be cooled and thus modifying the temperature of the room in which the device is used.

It is thought that persons skilled in the art to which the invention relates will be able to obtain a clear understanding of the invention after considering the description in connection with the drawings. Therefore a more lengthy description is regarded as unnecessary.

Minor changes in shape, size and rearrangement of details and parts such as come within the purview of the invention claimed may be resorted to in actual practice if desired.

Having now described my invention that which I claim as new and desire to procure by Letters Patent is:

1. An air conditioning unit including a housing provided with spaced tanks disposed transversely across its top and bottom and in the forward portion thereof, a series of tubes connected between said tanks, a water heating chamber in said lower tank spaced from its bottom, a series of inner tubes connected with said chamber and extending in spaced relation upwardly through said first-mentioned tubes terminating above the bottom of said upper tank, fluid in said tanks, means for heating said fluid to provide a continuous circulation of heated fluid upwardly from the lower tank through said inner tubes to said upper tank and back down through said outer tubes, and means for directing air through said heated tubes.

2. An air conditioning unit including a housing provided with spaced tanks disposed transversely across its top and bottom and in the forward portion thereof, a series of tubes connected between said tanks, a water heating chamber in said lower tank spaced from its bottom, a series of inner tubes connected with said chamber and extending in spaced relation upwardly through said first-mentioned tubes terminating above the ends thereof and above the bottom of said upper tank, fluid in said tanks, heat radiating fins on said outer tubes, a heating element in said heating chamber for heating said fluid to provide a continuous circulation of heated fluid upwardly from the lower tank through said inner tubes to said upper tank and back down through said outer tubes, and means for directing air through said heated tubes.

GEORGE D. ARNOLD.

REFERENCES CITED

The following references are of record in the file of this patent:

UNITED STATES PATENTS

| Number | Name | Date |
| --- | --- | --- |
| 1,666,816 | Falk | Apr. 17, 1928 |
| 1,898,571 | Prince | Feb. 21, 1933 |
| 2,025,216 | Opitz | Dec. 24, 1935 |
| 2,196,826 | Haas | Apr. 9, 1940 |
| 2,244,172 | Novak | June 3, 1941 |
| 2,305,551 | Novak | Dec. 15, 1942 |
| 2,344,812 | Gill | Mar. 21, 1944 |
| 2,360,071 | Noll | Oct. 10, 1944 |